United States Patent [19]

Cole et al.

[11] Patent Number: 5,543,599
[45] Date of Patent: Aug. 6, 1996

[54] ELECTRON DISCHARGE MACHINING APPARATUS AND METHOD

[75] Inventors: William G. Cole, Greensburg; Jeffrey E. Hydeman, Murrysville; James M. Gunsallus, Jr., Elizabeth; Qui Le, Pittsburgh, all of Pa.

[73] Assignee: Westinghouse Electric Corporation, Pittsburgh, Pa.

[21] Appl. No.: 355,584

[22] Filed: Dec. 14, 1994

[51] Int. Cl.⁶ .............................. B23H 1/00; B23H 7/26; B23H 9/00
[52] U.S. Cl. ..................... 219/69.2; 219/69.17; 376/260
[58] Field of Search ................. 219/69.2, 69.15, 219/69.17; 376/260, 245

[56] References Cited

U.S. PATENT DOCUMENTS

| | | | |
|---|---|---|---|
| 2,263,412 | 11/1941 | Armentrout | 219/69.17 |
| 4,438,805 | 3/1984 | Gugel | 165/76 |
| 4,710,710 | 12/1987 | Flora et al. | 324/220 |
| 4,788,026 | 11/1988 | Widener | 376/245 |
| 4,804,814 | 2/1989 | Southerland et al. | 219/69.2 |
| 4,948,933 | 8/1990 | Thompson | 219/69.2 |
| 5,089,681 | 2/1992 | El-Menshawy | 219/69.17 |
| 5,115,112 | 5/1992 | Fitz, III et al. | 219/69.2 |
| 5,225,645 | 7/1993 | Overbay et al. | 219/69.11 |
| 5,317,607 | 5/1994 | Formanek | 376/260 |
| 5,408,883 | 5/1995 | Clark, Jr. et al. | 376/260 |

FOREIGN PATENT DOCUMENTS 2687946  9/1993  France .

Primary Examiner—Geoffrey S. Evans
Attorney, Agent, or Firm—Walter S. Stevens

[57] ABSTRACT

Electric discharge machining apparatus and method. An electron discharge machining apparatus and method is provided for precisely machining a wall of a tubular member to form a wall portion thereof defined by a slot of predetermined configuration at a predetermined location in a wall of the tubular member. The tubular member may be a nuclear steam generator tube. The apparatus includes a housing sized to be disposed in the tube, the housing having an opening therethrough capable of being aligned with the predetermined location in the tube wall to be electromachined. An electrode is housed in the housing for generating an electric discharge arc between the electrode and the wall of the tube in order to machine the slot at the predetermined location. A rotator is connected to the housing for precisely rotating the housing, so that the opening formed through the housing is rotated into registry with the predetermined location to be electro-machined. An extender mechanism housed in the housing is connected to the electrode for precisely extending the electrode through the opening of the housing as the electrode machines the tube wall. As the electrode forms the slot in the wall of the tube, the extender mechanism, which includes a worm gear, gear wheel and threaded axle combination connected to the electrode, precisely advances the electrode to precisely electro-machine the slot in the wall of the tube.

23 Claims, 9 Drawing Sheets

ELECTRON DISCHARGE MACHINING APPARATUS AND METHOD

This invention generally relates to electric discharge machining apparatus and methods and more particularly relates to an electric discharge machining apparatus and method for precisely machining a wall of a tubular member, such as a nuclear steam generator tube, to form a portion thereof of predetermined configuration at a predetermined location in the wall.

It is well known that a typical nuclear steam generator or heat exchanger generates steam when heat is transferred from a heated and radioactive primary fluid to a nonradioactive secondary fluid of lower temperature. In order to accomplish the heat transfer, the secondary fluid surrounds a plurality of leak-tight heat transfer tubes disposed in the steam generator as the heated primary fluid flows through the tubes.

Occasionally, however, the steam generator tubes may experience tube wall cracking and thus may not remain leak-tight. If through-wall cracking occurs, the radioactive primary fluid may leak through the cracks and commingle with the nonradioactive secondary fluid, a highly undesirable result. Therefore, the tubing material may be periodically sampled and analyzed in order to determine the condition or morphology of the tubing material (e.g., whether tube wall cracking is immanent).

One prior art method of obtaining the necessary samples is to "pull" or extract one or more of the heat transfer tubes in order to preform analyses thereon. More specifically, the tube "pull" process includes cutting away of a section of the heat transfer tube by means of a cutting tool disposed in the tube, pulling the severed tube section through the tubesheet hole, progressively cutting off segments of the severed tube section and then analyzing the tube segments for evidence of cracking and/or corrosion. This process may be repeated until the entire heat transfer tube is extracted from the steam generator. A plug is installed in the empty tubesheet hole formally occupied by the heat transfer tube.

However, applicants have observed that the tube pull process is time consuming because it requires up to approximately 24 hours per tube to complete. Thus, the time required to perform the tube pull process may undesirably extend plant outages and may increase radiation exposure to service personnel performing the "tube pull". It is important to avoid an extended plant outage because such an extended outage may result in approximately $300,000 per day in replacement power costs to the reactor owner. Also, it is important to avoid increased radiation exposure to service personnel because U.S. Government regulations require radiation exposure to be held to a level that is as low as reasonably achievable and imposes a penalty on the reactor owner when radiation exposure is above this level.

Hence, there has been a long felt need in the industry to provide an apparatus and method for sampling the tubes that is not time consuming, does not result in extended plant outages and does not increase radiation exposure to service personnel. Therefore, such an apparatus and method should be capable of sampling the tube without the time consuming need to "pull" the tube.

Consequently, in order to obviate the need to pull the tube to perform analysis thereon, it would be preferable to remove only a portion of the tube wall while leaving the remainder of the tube in-place. The tube can then be sleeved or plugged after the portion (i.e., sample) of the tube wall has been removed.

However, before the above-mentioned portion (i.e., sample) can be removed from the tube wall, the tube wall must first be cut. Electric discharge machining may be advantageously used for this purpose. Electric discharge machining is preferred for "cutting" the sample from the wall of the tube to be analyzed because electric discharge machining minimizes distortion of the sample material. The use of cutting wheels, on the other hand, will typically induce distortion in the material of the sample cut from the tube wall. It is important to have minimal distortion in the tube sample in order to obtain a sample that is most representative of the condition of the tube from which it has been obtained. Moreover, it is important to precisely machine the sample from the tube wall in order to obtain the precise sample size for analysis in addition to reducing possible distortion of the sample.

Electric discharge machining devices are known. An electric discharge machining tool is disclosed in U.S. Pat. No. 4,804,814 titled "Electron Discharge Machining Tool" issued Feb. 14, 1989 in the name of Tommy J. Southerland, et al. This patent discloses an electric discharge machining tool for removing an installed nuclear steam generator tube plug. However, this patent does not appear to disclose an electric discharge machining apparatus and method for precisely machining a wall of a tubular member, such as a nuclear steam generator tube.

Therefore, what is needed are an apparatus and method for precisely machining a wall of a tubular member, such as a nuclear steam generator tube to form a portion thereof of predetermined configuration at a predetermined location in the wall.

SUMMARY OF THE INVENTION

In its broad form, the invention is an electric discharge machining apparatus for precisely machining a wall of a tubular member at a predetermined location thereof, comprising electrode means sized to be disposed in the tubular member for generating an electric discharge arc to machine the wall at the predetermined location; rotation means connected to the electrode means for precisely rotating the electrode means into registry with the predetermined location to be machined; and extender means connected to the electrode means for precisely radially extending said electrode means as the electrode means machines the wall of the tubular member.

In its broad form, the invention is also a method of precisely electric discharge machining the wall of a tubular member to form a slot of predetermined configuration at a predetermined location in the wall of the tubular member, comprising the steps of generating an electric discharge by energizing an electrode; precisely rotating the electrode into registry with the predetermined location by operating a rotator connected to the electrode; and radially precisely extending the electrode as the electrode generates the electric discharge by operating an extender mechanism connected to the electrode.

An object of the present invention is to provide an apparatus and method for precisely machining a wall of a tubular member, such as a nuclear steam generator tube.

Another object of the present invention is to facilitate obtaining a tube sample from a nuclear steam generator tube in a manner obviating the need to "pull" the tube.

A feature of the present invention is the provision of extender means connected to an electric machining electrode of predetermined configuration for precisely extending the electrode to a position adjacent the location of the tube wall to be machined.

An advantage of the present invention is that the tube wall is quickly and precisely machined in such a manner that a sample of the tube wall material can then be subsequently retrieved and suitably analyzed.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following description taken in conjunction with the accompanying drawings wherein:

DESCRIPTION OF THE PREFERRED EMBODIMENT

Figure 1:
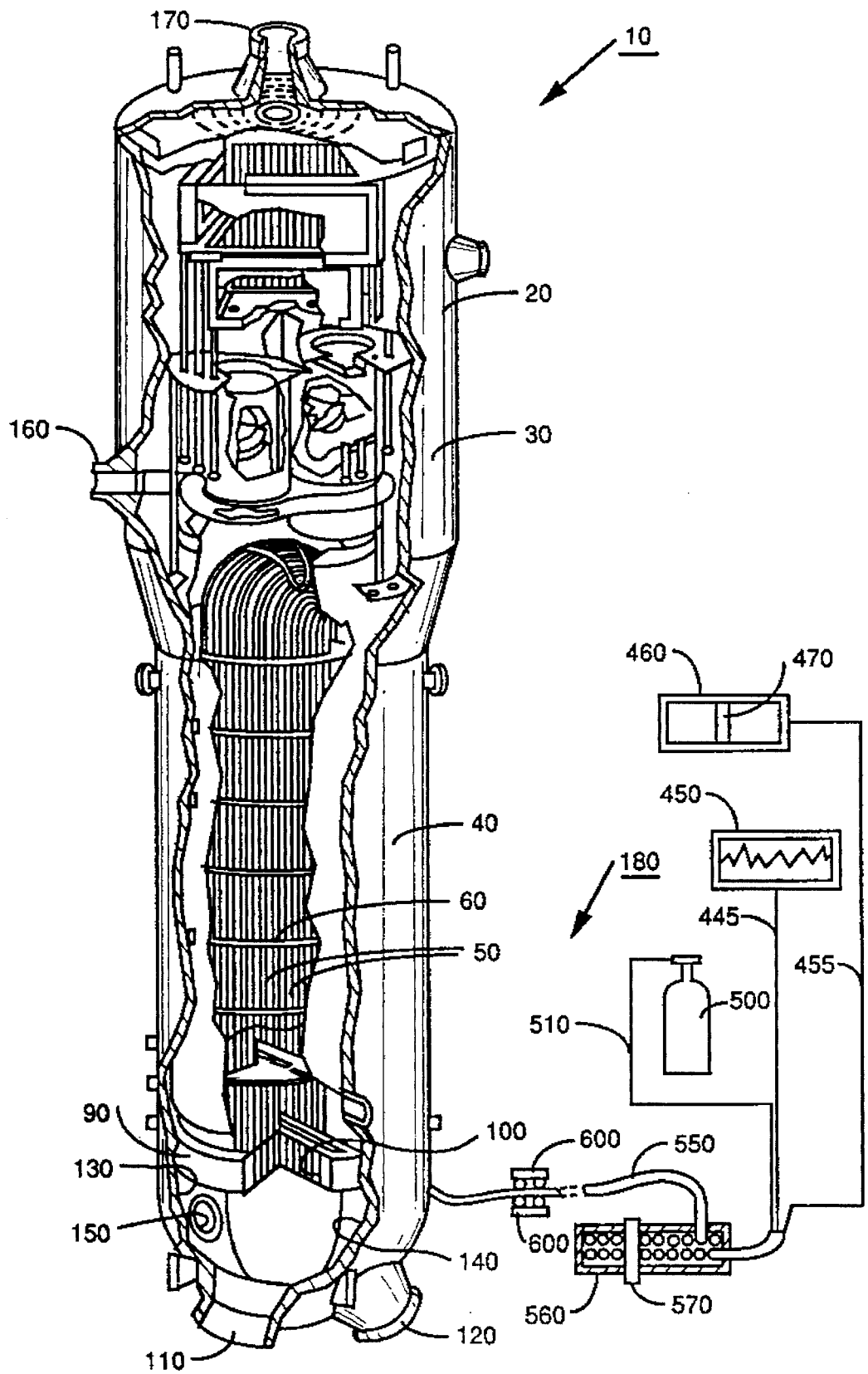
FIG. 1 is a perspective view in partial vertical section of a typical nuclear steam generator with parts removed for clarity, the steam generator having a plurality of inverted U-shaped heat transfer tubes disposed therein.

Referring to FIG. 1, there is shown a typical nuclear steam generator or heat exchanger, generally referred to as 10, for generating steam. Steam generator 10 comprises a shell 20 having an upper portion 30 and a lower portion 40. Disposed in lower portion 40 are a plurality of inverted U-shaped heat transfer tubes 50 that extend through respective ones of a plurality of holes 55 (see FIG. 2) formed through each of a plurality of horizontal support plates 60. Each tube 50 is leak-tight, has a wall 65 with an inner surface 70, and has a pair of tube ends 80 (see FIG. 2). Moreover, each tube 50 is made of a conductive material, such as "INCONEL" stainless steel, or the like. As shown in FIG. 1, disposed in lower portion 40 is a tubesheet 90 having holes 100 therethrough for receiving tube ends 80. Attached to shell 20 are a first inlet nozzle 110 and a first outlet nozzle 120 in fluid communication with an inlet plenum chamber 130 and with an outlet plenum chamber 140, respectively. A plurality of manway holes 150 are formed through shell 20 below tube-sheet 90 for allowing access to inlet plenum chamber 130 and outlet plenum chamber 140. Moreover, attached to shell 20 above tubesheet 90 is a second inlet nozzle 160 for entry of a non-radioactive secondary fluid into shell 20. A second outlet nozzle 170 is attached to the top of upper portion 30 for exit of steam from steam generator 10.

During operation of steam generator 10, radioactive primary fluid heated by a nuclear reactor core (not shown) enters inlet plenum chamber 130 through first inlet nozzle 110 and flows through tubes 50 to outlet plenum chamber 140 where the primary fluid exits steam generator 10 through first outlet nozzle 120. As the primary fluid enters inlet plenum chamber 130, the secondary fluid simultaneously enters second inlet nozzle 160 to ultimately surround tubes 50, such that a portion of this secondary fluid vaporizes to steam due to conductive heat transfer from the primary fluid flowing through tubes 50 to the secondary fluid surrounding tubes 50. The steam exits steam generator 10 through second outlet nozzle 170 and is conducted to a turbine-generator set (not shown) for producing electricity in a manner well known in the art.

It is prudent to periodically analyze the tubing material comprising tubes 50 in order to establish the condition (e.g., whether tube wall cracking is eminent) of tubes 50 by appropriate analysis of tubes 50.

Figure 2:
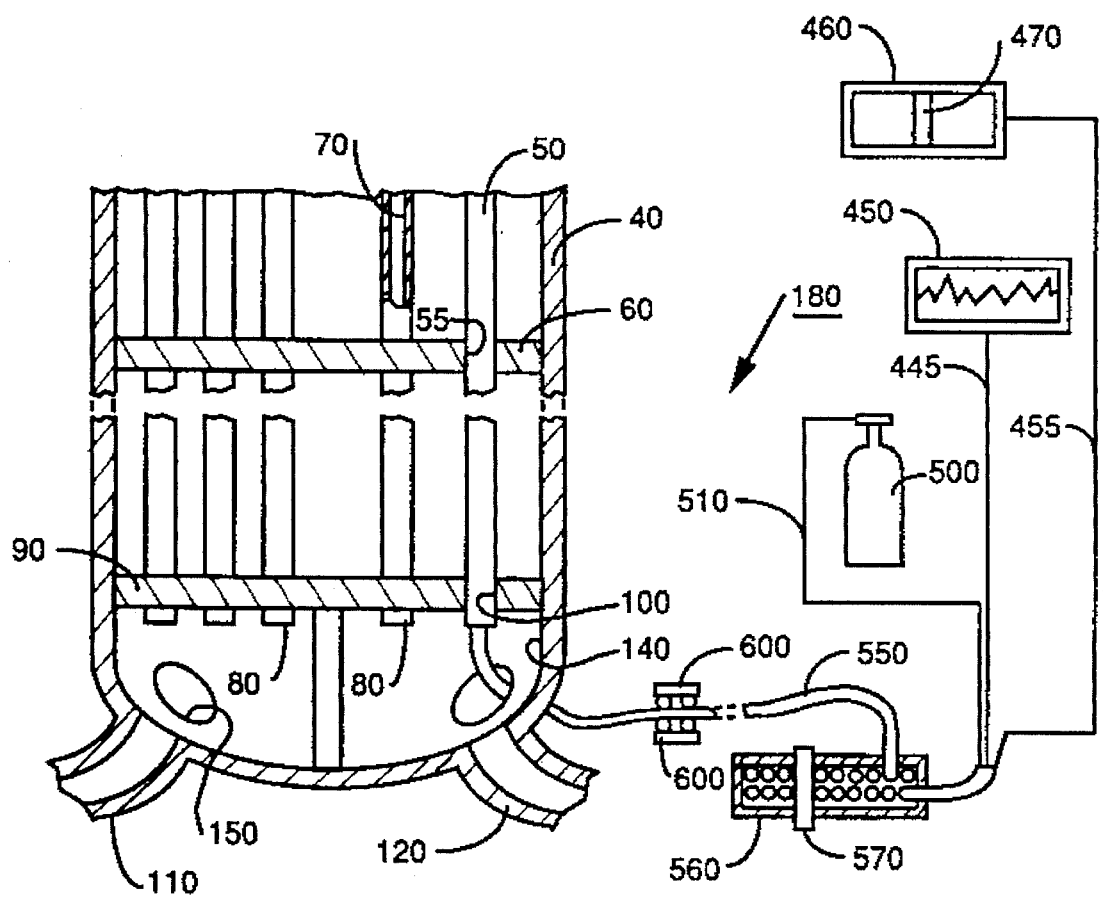
FIG. 2 is a view in vertical section of a lower portion of the steam generator, this view also showing the invention in operative condition to electro-machine a selected one of the heat transfer tubes.
Figure 3:
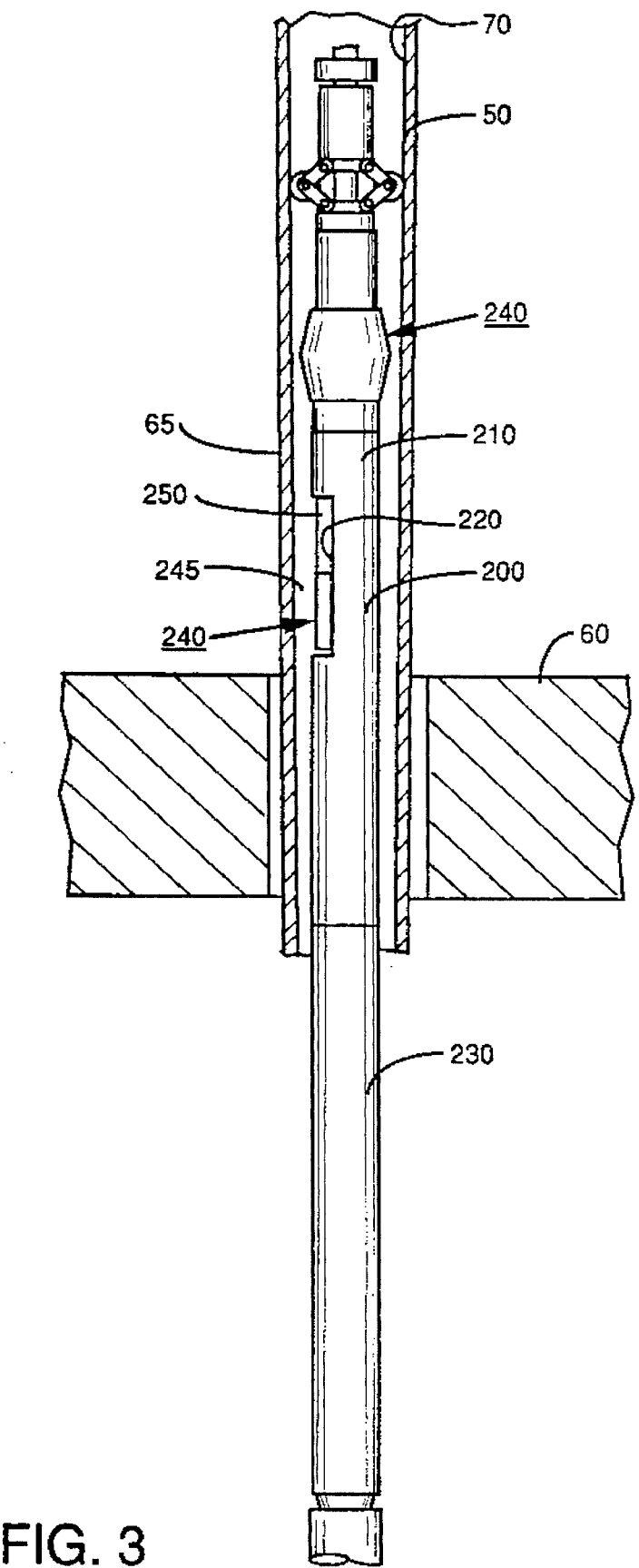
FIG. 3 is a view in full elevation of the invention disposed in the selected tube to be electro-machined.
Figure 4:
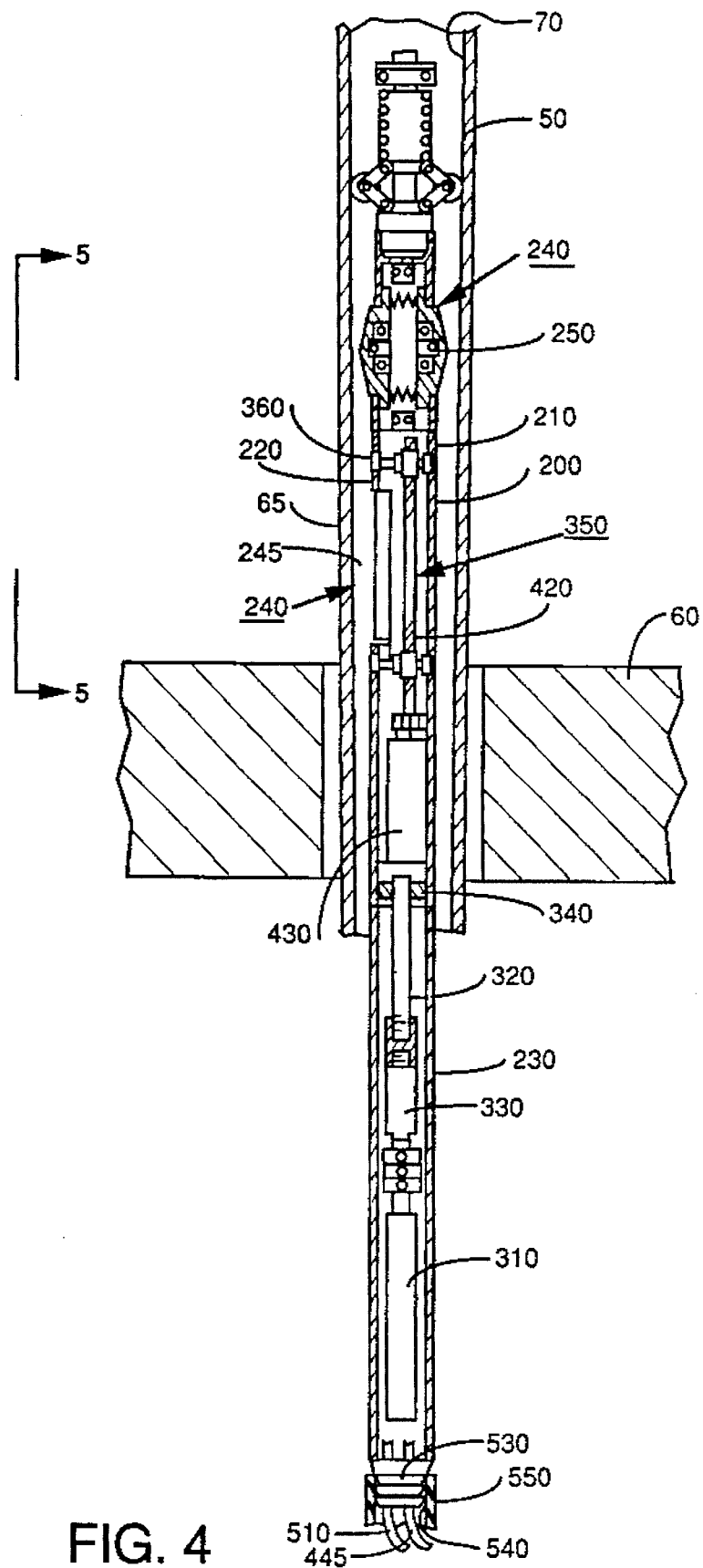
FIG. 4 is a view in vertical section of the invention disposed in the selected tube to be electro-machined.
Figure 5:
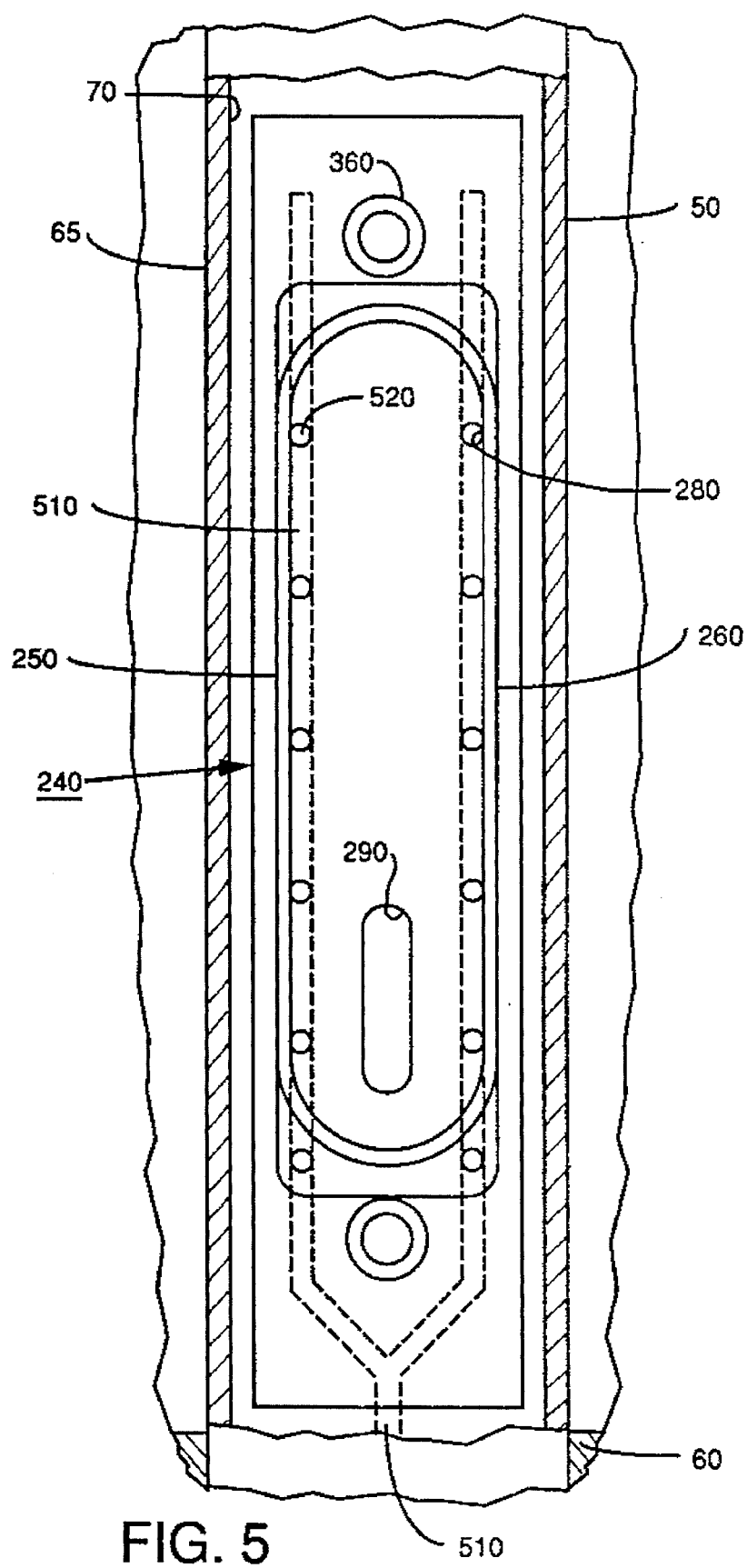
FIG. 5 is a view along section line 5—5 of FIG. 4.

Therefore, referring to FIGS. 2, 3 and 4, there is shown the subject matter of the present invention, which is an electric discharge machining apparatus, generally referred to as 180, for machining a slot 190 of predetermined configuration (see FIG. 9) at a predetermined location (e.g., slightly above the elevation of support plate 60 and/or tubesheet 90) in wall 65 of tube 50. As described in more detail hereinbelow, the configuration of slot 190 is such that it will define a wall portion 195 having hinges, tabs, or ligatures 197, integrally connecting wall portion 195 to wall 65 of tube 50 (see FIG. 9). It is important that ligatures 197 are present after use of apparatus 180. This is important because wall portion 195 should preferably remain in place (attached to wall 65) during the time interval that apparatus 180 is extracted from tube 50 and a suitable removal tool (not shown) is inserted into tube 50. The purpose of the removal tool is to sever ligatures 197 and retrieve wall portion 195 from wall 65, which will then be transported to a testing station (not shown) for analysis of the morphology of wall portion 195, A removal tool suitable for this purpose is disclosed in U.S. patent application Ser. No. 08/355,584 titled "Apparatus And Method For Removing A Wall Portion From A Wall Of A Tubular Member" filed the same day as the present patent application in the name of Jeffrey E. Hydeman, et al. and assigned to the assignee of the present invention, the disclosure of which is hereby incorporated by reference.

As shown in FIGS. 2, 3 and 4, apparatus 180 comprises a generally tubular housing 200 sized to be disposed in tube 50. Housing 200 has a rotatable distal end portion 210 having an opening 220 therethrough oriented parallel to wall 65 of tube 50 for reasons disclosed hereinbelow. Moreover, housing 200 has a proximal end portion 230 preferably nonrotatable with respect to distal end portion 210. Of course, it will be understood with reference to the several figures, that the terminology "proximal end portion" means that end portion closer to tubesheet 90 and the terminology "distal end portion" means that end portion further away from tubesheet 90.

Referring to FIGS. 3, 4, 5, 6, 8 and 9, electrode means, generally referred to as 240, is sized to be disposed in housing 200 for generating an electric discharge arc across a variable gap 245 defined between electrode means 240 and inner surface 70. Electrode means 240 includes an electrode 250 having a generally oval shape in longitudinal cross-section to remove, disassociate, or machine material from wall 65, so as to define the substantially oval-shaped slot 190. In this regard, electrode 250 is electrically connected to a suitable power supply (not shown) for supplying electrical power to electrode 250. Electrode 250 may be of a graphite or tungsten-copper composition for producing the desired electric discharge arc. It should be appreciated from the description hereinabove that electrode 250 need not be oval-shaped; rather, electrode 250 make take any of a variety of shapes, if desired, to machine a corresponding variety of shapes of slot 190. Electrode 250 has a pair of gaps or recesses 260 formed therein incapable of generating the electric discharge arc. Consequently, the presence of recesses 260 will cause electrode 250 to remove material from wall 65 except at the locations of wall 65 aligned with or corresponding to recesses 260. In addition, electrode 250 has a plurality of flow holes 280 for passage therethrough of a suitable dielectric, such as deionized water. Moreover, electrode 250 has another hole 290 for receiving a clip member (not shown) to hold electrode 250 in place.

As best seen in FIG. 4, housed in proximal end portion 230 of housing 200 is rotation means, generally referred to as 300, connected to distal end portion 210 of housing 210 for rotating distal end portion 210. Rotation means 300 comprises a reversible, variable speed motor 310 coupled to an elongate shaft 320 by a coupling 330. Shaft 320 is attached to distal end portion 210, as at attachment point 340, so that distal end portion 210 of housing 200 rotates as shaft 320 rotates. Of course, suitable bearing means (not shown) may be interposed between distal end portion 210 and proximal end portion 230 in order that distal end portion 210 freely rotates with respect to proximal end portion 230 of housing 200. As described in more detail hereinbelow, it is important that distal end portion 210 be rotatable. This is important in order to allow rotation of electrode into registry with the predetermined location of wall 65 to be electro-machined. Moreover, it will be appreciated from the description hereinabove, that motor 310, which is sized to be disposed in proximal end portion 230 of housing 200, is capable of varying the direction and speed of rotation of distal end portion 210.

Figure 6:
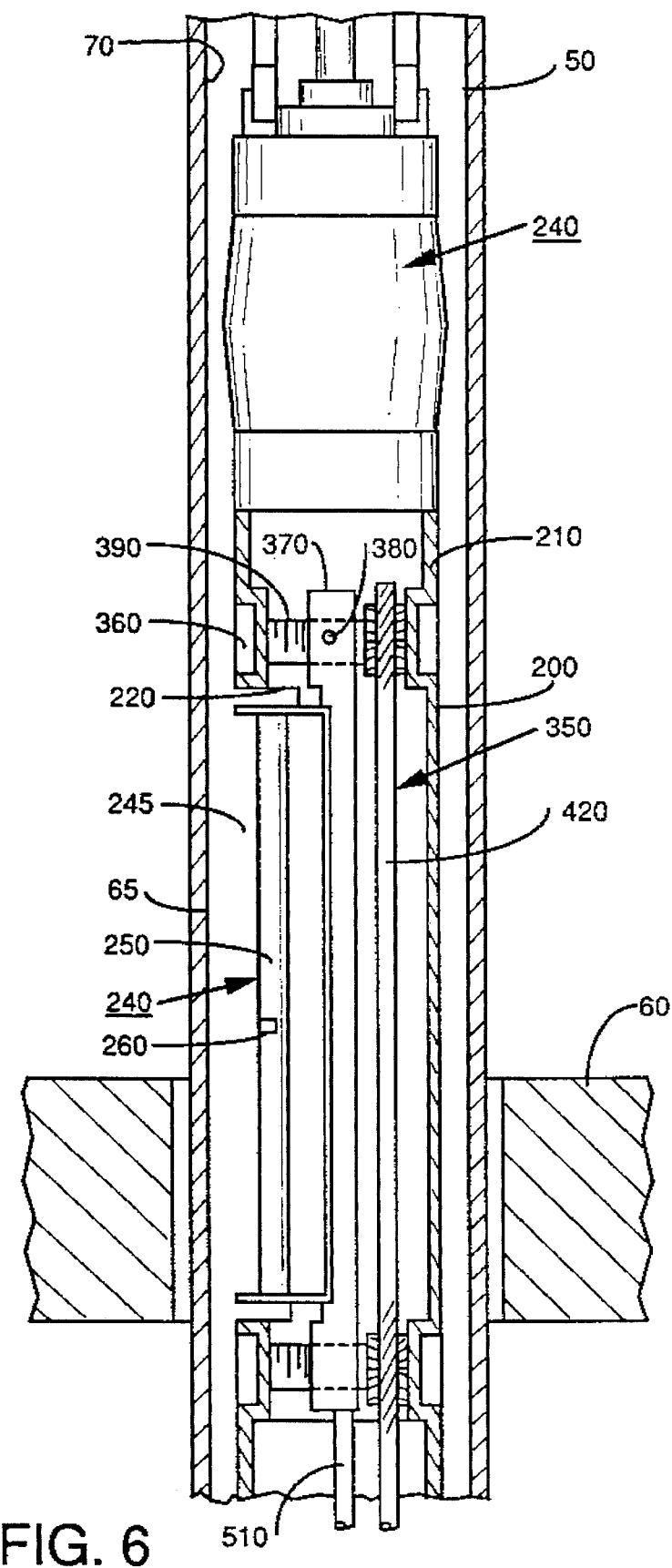
FIG. 6 is a view in vertical section of the invention showing extender means connected to an electrode for precisely moving or extending the electrode as the electrode electro-machines the tube wall.
Figure 7:
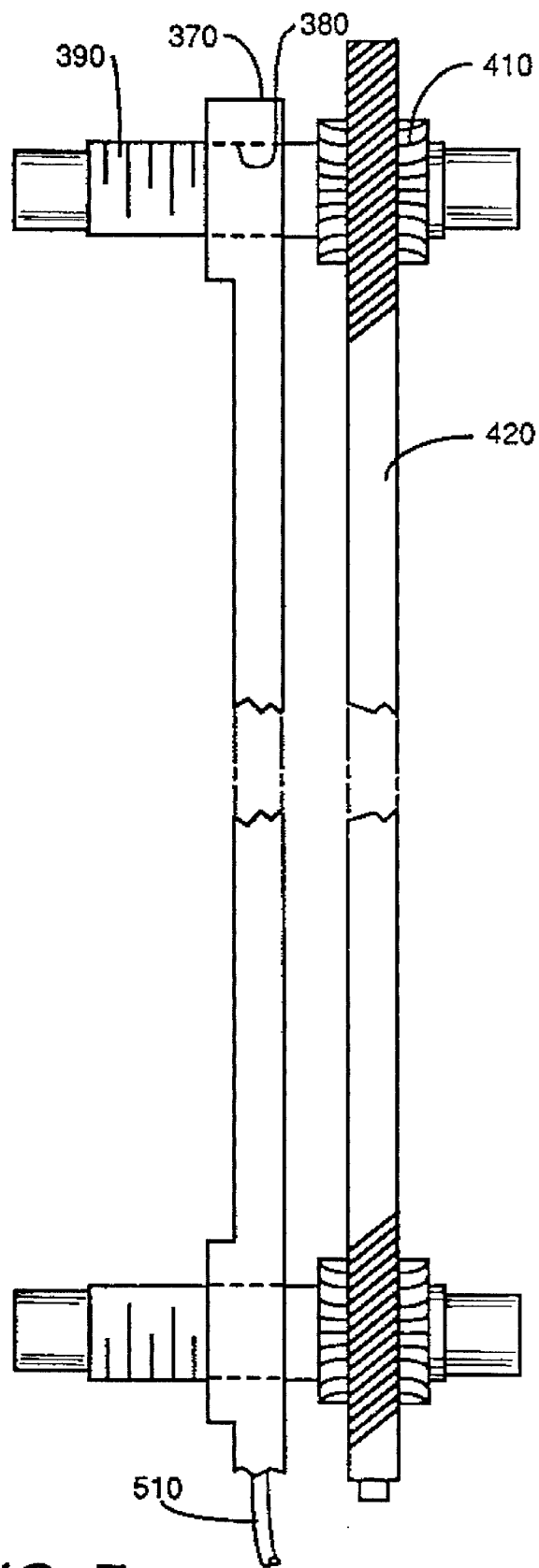
FIG. 7 is a view in elevation of a gear wheel, axle and worm gear for precisely extending the electrode as the electrode electro-machines the tube wall.
Figure 8:
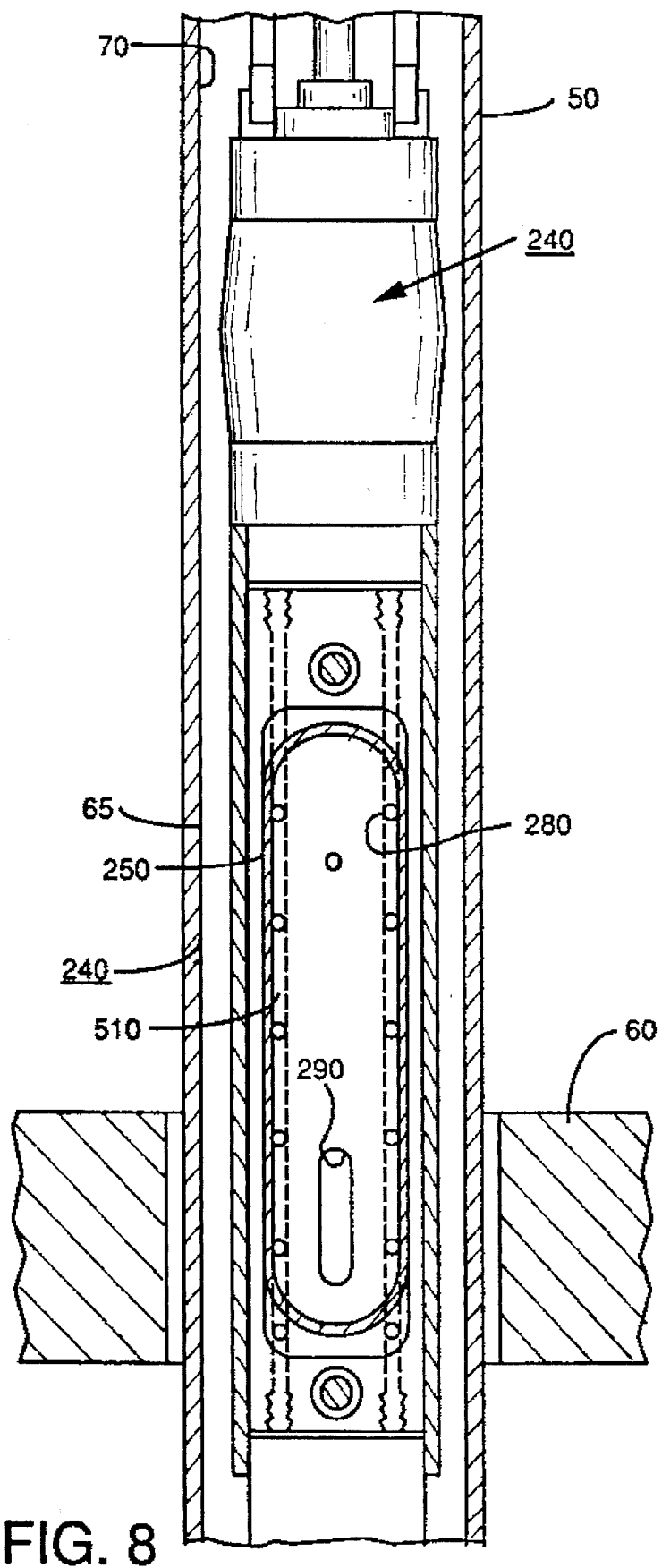
FIG. 8 is a view in partial vertical section of the invention disposed in the tube to be electro-machined.

Referring to FIGS. 4, 6 and 7, extender means, generally referred to as 350, is disposed in distal end portion 210 of housing 200 and is connected to electrode means 240 for radially translating extending electrode means 240 to a precise position adjacent the predetermined location of wall 65 prior to machining and also to precisely translate electrode means 240 toward wall 65 as electrode means 240 machines wall 65. More specifically, affixed to electrode 250, such as by a plurality of screws 360, is a generally elongate platen 370. Platen 370 has a threaded bore 380 therethrough threadably receiving an externally threaded axle 390. Axle 390 has a portion thereof affixed in a bore 400 formed through a rotatable gear wheel 410, so that axle 390 rotates as gear wheel 410 rotates. Gear wheel 410 has a plurality of gear teeth therearound for reasons disclosed presently. An elongate worm gear 420 engages the gear teeth of gear wheel 410 for rotating gear wheel 420 as worm gear 420 rotates about its longitudinal axis. A reversible variable speed motor 430, which is sized to be disposed in proximal end portion 230 of housing 200, engages a proximal end portion of worm gear 420 for rotating worm gear 420. It will be understood from the description hereinabove that worm gear 420 rotates as motor 430 operates because motor 430 engages the proximal end portion of worm gear 420. It will be further understood from the description hereinabove that gear wheel 410 precisely rotates as worm gear 420 precisely rotates because the teeth of worm gear 420 engages the teeth of gear wheel 410. It will also be understood from the description hereinabove that axle 390 rotates as gear wheel 410 rotates because axle 390 is affixed in bore 400 of gear wheel 410. As axle 390 rotates, it threadably engages threaded bore 380 formed through platen 370. Of course, platen 370 will precisely move or translate along externally threaded axle 390 as threaded axle 390 rotatably threadably engages threaded bore 380. In this regard, the direction of translation of platen 370 will depend on the direction of rotation of axle 390.

Referring to FIGS. 1, 2, 3, 4, 6 and 8, attached to distal end portion 210 of housing 200 is a sensor, generally referred to as 440, for identifying the predetermined location in wall 65 to be electro-machined. The predetermined location identified by sensor 440 may be, for example, a location in wall 65 having cracking or tube wall thinning therein. Sensor 440 may be an eddy current transducer for generating a plurality of eddy currents in wall 65 of tube 50 and for detecting the eddy currents generated thereby. Sensor 440 then generates a sensor output signal in response to eddy currents detected by sensor 440. Alternatively, sensor 440 may be an ultrasound transducer for generating sonic energy penetrating wall 65, which will reflect the sonic energy therefrom. The ultrasound transducer then receives the sonic energy reflected by wall 65 and generates an electric output signal in response to the reflected sonic energy. As best illustrated in FIGS. 1 and 2, sensor display means, such as a sensor display monitor 450 is electrically connected to sensor 440, such as by a first electrical wire 445, for displaying the output signals generated by sensor 440.

As best seen in FIGS. 1 and 2, electrically connected to motors 310 and 430, such as by a second electrical wire 455, is a controller 460 for controllably selectively operating motors 310/430. Controller 460 may include a computer 470 programmed with an algorithm to automatically operate motors 310/430 and thus automatically control the rotation of distal end portion 210 of housing 200 and the translation of platen 370. A controller suitable for this purpose is available from the Westinghouse Electric Corporation located in Pittsburgh, Pa.

Returning to FIGS. 3 and 4, centering means, generally referred to as 480, is connected to distal end portion 210 of housing 200 for precisely centering housing 200 along the longitudinal axis of tube 50, so that the exterior of housing 200 does not scrape or mar inner surface 70 of tube 50. It is important that housing 200 not mar inner surface 70. This is important because marring of inner surface 70 may otherwise provide localized sites for corrosion cracking of tube 50 during operation of steam generator 10. Centering means 480 has a plurality of radially adjustable wheels 490 for adjustably engaging inner surface 70 of tube 50. Wheels 490 may be spring-biased outwardly, so that wheels 490 adjustably engage inner surface 70 in order to center housing 200 in tube 50.

Referring now to FIGS. 1, 2 and 3, in fluid communication with electrode 250 is dielectric fluid supply means, such as a dielectric fluid supply reservoir 500, for supplying a dielectric fluid (e.g., deionized water) to gap 245 which is defined between electrode 250 and inner surface 70 of wall 65. Fluid reservoir 500 communicates with electrode 250 by means of a conduit 510, which interconnects fluid reservoir 500 and electrode 250. Conduit 510 has a plurality of holes 520 in an end portion thereof arranged coincident with flow holes 280 formed in electrode 250. Thus, as the dielectric fluid flows through conduit 510, it will exit holes 520 and flow out flow holes 280 and into gap 245 which is defined between electrode 250 and inner surface 70 of tube 50.

As best seen in FIGS. 1, 2 and 4, proximal end portion 230 of housing 200 has a plurality of serrations 530 on the external surface thereof for intimately engaging the interior surface 540 of a flexible hose 550, so that housing 200 is removably connectable to hose 550. Hose 550 may be fed from about a suitable take-up reel or coiler 560, which is rotatable about a central axle 570. It should be appreciated that first electrical wire 445 extends through hose 550 for interconnecting display monitor 450 with sensor 240. Moreover, second electrical wire 445 extends through hose 550 for interconnecting controller 460 with motors 310 and 430. In addition, extending through hose 550 is conduit 510 interconnecting fluid reservoir 500 with holes 280 of electrode 250 for supplying the deionized fluid to gap 245. Further, engaging hose 550 is a probe driver 600 for translating hose and thus housing 200 in tube 50.

Figure 9:
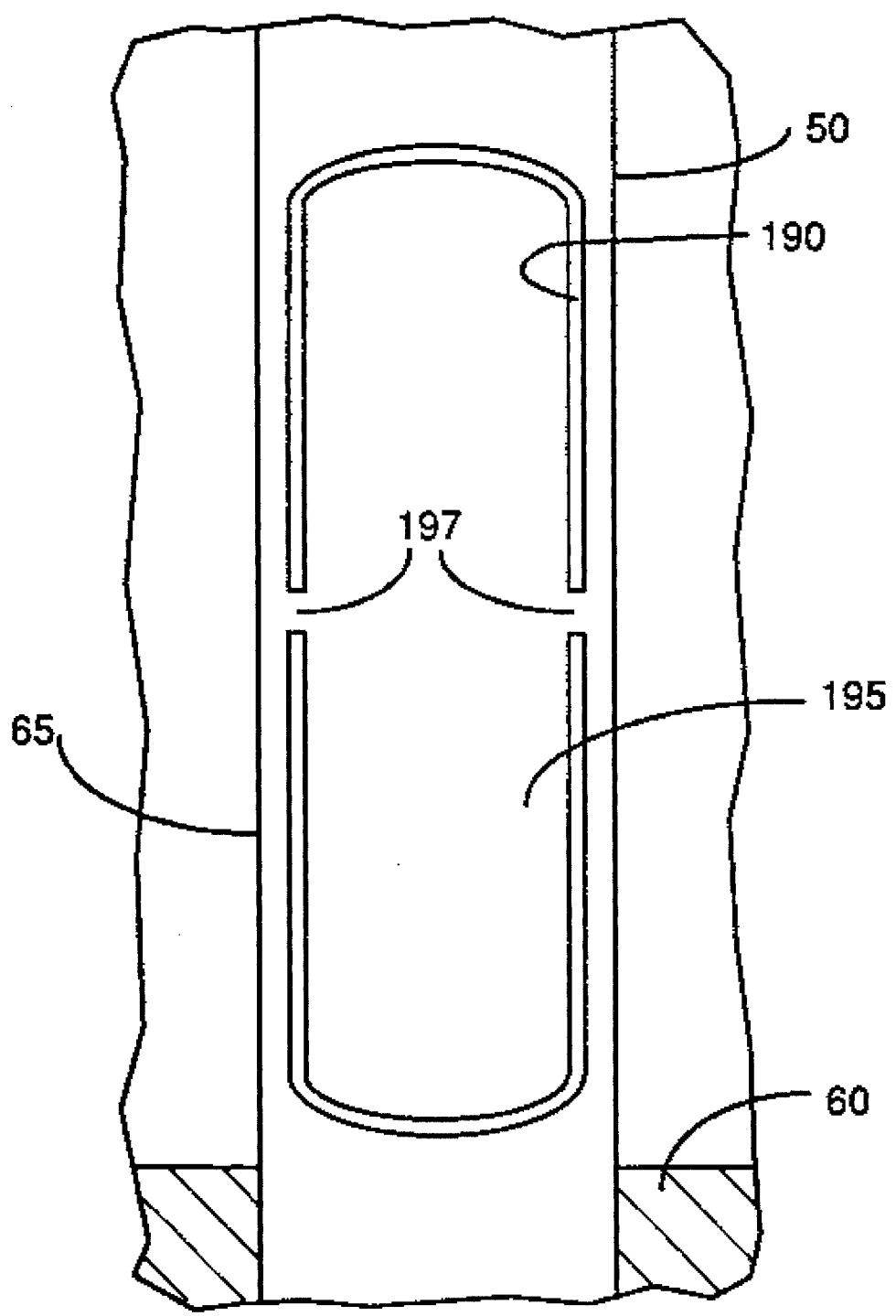
FIG. 9 is a view in elevation of the exterior of the tube wall after electro-machining thereof.

Referring to FIG. 9, there is shown slot 190 formed in wall 65 after operation of electric discharge machining apparatus 180.

OPERATION

Steam generator 10 is first removed from service in the manner customarily used in the art. Next, apparatus 180 is transported sufficiently near steam generator 10 to electro-machine slot 190 in wall 65. In this regard, housing 200 and conduit 550 connected thereto are inserted through manway 150 and into tube 50, such as by a suitable robotic mechanism (not shown) removably connected to housing 200. A robotic mechanism suitable for this purpose may be a ROSA (Remotely Operated Service Arm) robotic device available from the Westinghouse Electric Corporation located in Pittsburgh, Pa. Housing 200 is then translated in tube 50 by operation of probe driver 600 which engages hose 550. Sensor 240 is operated as probe driver 600 translates housing 200 in tube 50 in order to locate the predetermined location in wall 65 to be electro-machined. The predetermined location of wall 65 to be electro-machined may be any portion thereof evincing tube wall cracking or thinning. Of course, as housing 200 translates in tube 50, hose 550 will uncoil from about coiler 560. After the predetermined location in wall 65 to be electro-machined is located by sensor 240, motor 310 is operated, if necessary, to rotate distal end portion 210 of housing 200, so that opening 220 formed in housing 200 faces or is aligned with the predetermined location of wall 65 identified by sensor 240.

Next, motor 430 is operated to rotate worm gear 420, which in turn rotates gear wheel 410 because worm gear 420 engages gear wheel 410. As gear wheel 410 rotates, threaded axle 390 rotates because axle 390 is affixed in bore 400 of gear wheel 410. As axle 390 rotates, platen 370 precisely translates along axle 390 due to the threaded engagement of threaded axle 390 with the threaded bore 380 of platen 370. As platen 370 precisely translates along axle 390, electrode 250 will precisely translate through opening 220 and toward wall 65 because electrode 250 is attached to platen 370 by screws 360. It will be appreciated from the description hereinabove, that translation of electrode 250 toward wall 65 of tube 50 is automatically precisely controlled by operation of controller 460 because controller 460 automatically precisely controls operation of motor 430, which in turn precisely controls rotation of worm gear 420. It will be further appreciated that precise control of worm gear 420 precisely controls the rotation of gear wheel 410 due to the engagement of the teeth of worm gear 420 with the gear teeth of gear wheel 410. Precise control of gear wheel 410 precisely rotates axle 390. Moreover, it will be appreciated by persons skilled in the art that precise control of the rotation of axle 390 precisely controls translation of platen 370 due to the threaded engagement of axle 390 in threaded bore 380 of platen 370. Precise control of the translation of platen 370 precisely controls the translation of electrode 250 because electrode 250 is attached to platen 370 by screws 360. It is important to automatically precisely control the translation of electrode 250 in order to precisely advance electrode 250 toward wall 65 as slot 190 is machined through wall 65.

As the electron discharge arc emanates from electrode 250 it will disintegrate or machine wall 65 so as to form slot 190. However, due to the configuration of electrode 250 (i.e., the presence of recesses 260), slot 190 machined in wall 65 will have a discontinuous portion at ligatures 197. That is, slot 190 will have a discontinuous portion in the sense that hinges, tabs or ligatures 197 will remain to integrally connect wall portion 275 to wall 65 after the electro-machining process. Electric machining apparatus 180 is then extracted from tube 50. After apparatus 180 is extracted from tube 50, a suitable removal tool (not shown) is inserted into tube 50. Wall portion 275 is removed by the removal tool for subsequent analysis of the condition or morphology of tube 50 (e.g., whether stress corrosion cracking is immanent). The removal tool contemplated herein will exert a downwardly-directed shear force acting upon ligatures 197, such that ligatures 197 are sheared or severed. The removal tool will then grip the severed wall portion 275 and remove it from tube 50 for analysis. The analysis may be provided by any of a number of well-known testing methods available in the art of materials testing.

After wall portion 275 is removed from tube 50, the tube 50 is then sleeved at the location where wall portion 275 has been removed, so that tube 50 remains in service although wall portion 275 has been removed. Alternatively, tube 50 may be plugged by a suitable tube plug to remove tube 50 from service. In either event, steam generator 10 is then returned to service in the manner customarily used in the art.

It will be appreciated from the description hereinabove that an advantage of the present invention is that tube wall 65 may now be precisely electro-machined as a precondition for removal of a sample therefrom by a suitable removal tool in a time-saving, cost-effective manner obviating the need to "pull" the tube.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, the invention is described herein as suitable for electro-machining the wall of a nuclear steam generator tube. However, the invention is suitable for use in electro-machining the wall of any similar tubular member, whether or not the tubular member is a nuclear steam generator tube.

Therefore, what is provided are an electric discharge machining apparatus and method for precisely machining a wall of a tubular member, such as a nuclear steam generator tube, to form a portion thereof of predetermined configuration at a predetermined location in the wall.

What is claimed is:

1. An electric discharge machining apparatus for precisely machining a wall of a tubular member at a predetermined location thereof, comprising:
   (a) electrode means sized to be disposed in the tubular member for generating an electric discharge arc to machine the wall at the predetermined location, said electrode means having a predetermined shape to form a slot in the wall of the tubular member corresponding to the predetermined shape of said electrode means;
   (b) rotation means connected to said electrode means for precisely rotating said electrode means into registry with the predetermined location to be machined;
   (c) extender means connected to said electrode means for precisely radially extending said electrode means as said electrode means machines the wall of the tubular member; and
   (d) controller means connected to said rotation means and to said extender means for controlling said rotation means and said extender means.

2. The apparatus of claim 1, further comprising sensor means associated with said electrode means for identifying the predetermined location of the tubular member to be machined.

3. The apparatus of claim 1, further comprising centering means connected to said electrode means and engaging the wall of the tubular member for precisely centering said electrode means in the tubular member.

4. The apparatus of claim 1, further comprising dielectric fluid supply means in communication with said electrode means for supplying a dielectric fluid between said electrode means and the wall of the tubular member.

5. The apparatus of claim 1, further comprising translation means connected to said electrode means for translating said electrode means in the tubular member to the predetermined location to be machined.

6. An electric discharge machining apparatus for precisely machining a wall of a tubular member to form a wall portion thereof of predetermined configuration at a predetermined location in the wall, comprising:
   (a) a housing sized to be disposed in the tubular member, said housing having an opening formed therethrough;
   (b) an electrode housed in said housing and extendable through the opening for generating an electric discharge arc between said electrode and the wall of the tubular member to machine the wall at the predetermined location;
   (c) a rotator connected to said housing for rotating said housing to rotate the opening formed therethrough into registry with the predetermined location to be machined;
   (d) an extender mechanism housed in said housing and connected to said electrode for precisely extending said electrode through the opening; and
   (e) a controller connected to said rotator and to said extender mechanism for controllably operating said rotator and said extender mechanism, so that said rotator controllably rotates said housing in order that the opening formed through said housing rotates into registry with the predetermined location and so that said extender mechanism controllable extends said electrode through the opening.

7. The apparatus of claim 6, wherein said electrode is of a generally oval shape, so that the wall portion formed at the predetermined location is generally oval-shaped.

8. The apparatus of claim 6, further comprising a sensor connected to said housing for identifying the predetermined location in the wall of the tubular member to be machined.

9. The apparatus of claim 8, wherein said sensor is an eddy current transducer for generating a plurality of eddy currents in the wall of the tubular member and for detecting the eddy currents generated thereby.

10. The apparatus of claim 8, wherein said sensor is an ultrasound transducer for generating sonic energy penetrating the wall of the tubular member and for receiving sonic energy reflected by the wall of the tubular member.

11. The apparatus of claim 6, wherein said controller comprises a computer connected to said rotator and to said extender mechanism, said computer being programmed to automatically controllably operate said rotator and to automatically controllably operate said extender mechanism.

12. The apparatus of claim 6, further comprising a centering assembly connected to said housing for precisely centering said housing in the tubular member.

13. The apparatus of claim 6, further comprising a dielectric fluid supply reservoir in fluid communication with said electrode for supplying a dielectric fluid between said electrode and the wall of the tubular member.

14. The apparatus of claim 6, further comprising a translation mechanism connected to said housing for axially translating said housing in the tubular member to axially align the opening of said housing with the predetermined location to be machined.

15. For use in a nuclear steam generator tube, an electric discharge machining apparatus for machining a wall of the tube to form a wall portion defined by a generally oval-shaped slot at a predetermined location in a wall of the tube, so that the wall portion thereof is suspended in the wall of the tube by a pair of ligatures integrally connecting the wall portion to the wall of the tube, the apparatus comprising:
   (a) a generally tubular housing sized to be disposed in the tube, said housing having a rotatable distal end portion having an opening therethrough oriented parallel to the wall of the tube, said housing having a proximal end portion nonrotatable with respect to the distal end portion of said housing;
   (b) an electrode housed in the distal end portion of said housing and extendable through the opening for generating an electron discharge arc across a gap defined between said electrode and the wall of the tube, said electrode having a generally oval shape to machine the generally oval shape of the slot, said electrode having a threaded bore therethrough;
   (c) a rotator housed in the proximal end portion of said housing and connected to the distal end portion of said housing for precisely rotating the distal end portion of said housing, so that the opening formed through the distal end portion of said housing is rotated into registry with the predetermined location in the wall of the tube as said rotator rotates the distal end portion of said housing, said rotator including a reversible variable speed first motor capable of varying the direction and speed of rotation of the distal end portion of said housing;
   (d) an extender mechanism housed in the distal end portion of said housing and connected to said electrode for radially precisely extending said electrode through the opening to a position adjacent the predetermined location in the wall of the tube as said electrode machines the wall of the tube, said extender mechanism including:
       (i) a rotatable gear wheel having gear teeth therearound and a bore centrally therethrough;
       (ii) an elongate axle affixed in the bore of said gear wheel, said axle having a threaded portion thereof threadably engaging the threaded bore of said electrode, whereby said axle rotates as said gear wheel rotates, whereby said axle rotatably threadably engages the threaded bore of said electrode as said axle rotates, and whereby said electrode translates along said axle and through the opening formed through the distal end portion of said housing as said axle rotatably threadably engages the threaded bore of said electrode;

(iii) a worm gear engaging the gear teeth of said gear wheel, so that said gear wheel rotates as said worm gear rotates;

(iv) a reversible variable speed second motor housed in the distal end portion of said housing and attached to said worm gear for varying the direction and speed of rotation of said worm gear;

(e) a sensor connected to said housing for identifying the predetermined location in the wall of the tube to be machined;

(f) a controller connected to said first motor for controlling said first motor to controllably rotate the distal end portion of said housing and connected to said second motor for controlling said second motor to controllably rotate said worm gear, so that said first motor rotates the distal end portion of said housing to align the opening formed therethrough into registry with the predetermined location and so that said second motor rotates said worm gear to translate said electrode through the opening, said controller including a computer connected to said first motor and to said second motor, said computer being programmed to controllably operate said first motor and said second motor;

(g) a dielectric fluid supply reservoir in fluid communication with said electrode for supplying a dielectric fluid into the gap defined between said electrode and the wall of the tube; and (h) a translation mechanism connected to the proximal end portion of said housing for translating said housing axially in the tube to axially align the opening at the predetermined location 16. The apparatus of claim 15, wherein said sensor is an eddy current transducer for generating a plurality of electromagnetic eddy currents in the wall of the tube and for detecting the eddy currents generated thereby.

17. The apparatus of claim 15, wherein said sensor is an ultrasound transducer for generating sonic energy penetrating the wall of the tube and for receiving the sonic energy reflected by the wall of the tubular member.

18. The apparatus of claim 15, further comprising a centering assembly connected to the distal end portion of said housing for precisely centering said housing in the tube.

19. A method of precise electric discharge machining a wall of a tubular member to form a wall portion thereof defined by a slot of predetermined configuration at a predetermined location in the wall of the tubular member, comprising the steps of:

(a) generating an electric discharge by energizing an electrode, the electrode having a predetermined shape to form a slot in the wall of the tubular member corresponding to the predetermined shape of the electrode;

(b) precisely rotating the electrode into registry with the predetermined location by operating a rotator connected to the electrode;

(c) precisely extending the electrode toward the wall of the tubular member by operating an extender mechanism connected to the electrode; and (d) controllably operating the rotator and the extender mechanism by operating a controller connected to the rotator and to the extender mechanism.

20. The method of claim 19, further comprising the step of identifying the predetermined location to be machined by operating a sensor connected to the electrode.

21. The method of claim 19, further comprising the step of precisely centering the electrode in the tubular member by engaging a centering assembly with the wall of the tubular member, the centering assembly being connected to the electrode.

22. The method of claim 19, further comprising the step of supplying a dielectric fluid between the electrode and the wall of the tubular member by operating a dielectric fluid supply reservoir in communication with the electrode.

23. The method of claim 19 further comprising the step of axially positioning the electrode at the predetermined location by operating a translation mechanism connected to the electrode, so that the electrode is translated in the tubular member.

* * * * *